United States Patent [19]

Lindsley

[11] Patent Number: 5,177,702
[45] Date of Patent: Jan. 5, 1993

[54] DEVICE AND METHOD FOR EVALUATING EXPONENTIALS

[75] Inventor: Brett L. Lindsley, Highwood, Ill.

[73] Assignee: Motorola, Inc., Schaumburg, Ill.

[21] Appl. No.: 555,325

[22] Filed: Jul. 19, 1990

[51] Int. Cl.$^5$ .............................................. G06F 7/38
[52] U.S. Cl. .............................................. 364/753
[58] Field of Search ............... 364/753, 752, 736, 735, 364/715.07

[56] References Cited

U.S. PATENT DOCUMENTS

| | | | |
|---|---|---|---|
| 3,631,230 | 12/1971 | Chen | 364/752 |
| 4,158,889 | 6/1979 | Monden | 364/753 |
| 4,225,933 | 9/1980 | Monden | 364/753 |
| 4,410,956 | 10/1983 | Yoshida | 364/753 |

OTHER PUBLICATIONS

T. C. Chen, "Efficient Arithmetic Apparatus and Method", IBM Technical Disclosure Bulletin, vol. 14, No. 1, Jun. 1971 pp. 328–330.
Walther, "A Unified Algorithm for Elementary Functions", Spring Joint Computer Conference, 1971, pp. 379–385.
Volder, "The Cordic Trigonometric Computer Technique" IRE Transactions on Electronic Computers, Sep. 1959, pp. 330–334.

Primary Examiner—Long T. Nguyen
Attorney, Agent, or Firm—Darleen J. Stockley

[57] ABSTRACT

A method and apparatus are described for processing an input value to provide an output exponential value of a desired base raised to the power of the input value. The method includes, and the apparatus included hardware for implementing, the steps of adjusting the input value relative to the input value, a predetermined base of a first exponential value, and the desired base of the output exponential value to obtain a first scaled value, modifying the scaled value to obtain an approximation value, determining the first exponential value of the approximation value, generating an adjusted error value relative to the first scaled value, the approximation value, and a logarithm of the predetermined base of the first exponential value, determining a correction value for the first exponential value and combining the first exponential value with the correction value to obtain, substantially, the output exponential value having the desired base raised to the power of the input value.

24 Claims, 2 Drawing Sheets

DEVICE AND METHOD FOR EVALUATING EXPONENTIALS

FIELD OF THE INVENTION

This invention is concerned with transcendental function evaluation (TFE). More particularly, this invention is concerned with a method and device for efficient evaluation of exponential functions.

BACKGROUND OF THE INVENTION

The need for efficient TFE arises especially in generating efficient math libraries for RISC (Reduced Instruction Set Computers) chips, CISC (Complex Instruction Set Computers) chips, digital signal processors (DSPs), and compilers. Present TFE systems typically utilize CORDIC (COordinate Rotation Digital Computer) computing techniques substantially as set forth by Jack E. Volder in *The CORDIC Trigonometric Computing Technique*, IRE Transactions on Electronic Computers, September, 1959, in *A Unified Algorithm For Elementary Functions*, by J. C. Walther, Spring Joint Computer Conference, 1971, or in Tien Chi Chen's techniques of U.S. Pat. No. 3,631,230 (1971).

Volder's utilization of the CORDIC technique sets forth two computing modes, rotation and vectoring, for trigonometric relationship determinations, depending on whether the coordinate components and angular argument of an original vector are given. Using a prescribed sequence of conditional additions or subtractions, Volder implements a CORDIC arithmetic unit to obtain a programmed solution of trigonometric relationships. Walther suggests that similar algorithms may be implemented for solution of exponentials by computing hyperbolic sine and hyperbolic cosine in the CORDIC rotation mode.

Walther utilizes a hardware fixed point processor to implement unifying algorithms containing CORDIC schemes. While the Walter unifying algorithms have been implemented since 1971, such algorithms are hampered by a low rate of convergence. Chen's method of computing exponentials essentially cuts the Taylor series to one term and utilizes that term for a series expansion. Chen's hardware implementation was formulated to remove multiplication operations and replace them with a single shift-add operation. Chen's algorithms require algorithmic iterations to provide an initial approximation to a function, requiring special purpose hardware for efficient implementation.

Further improvement in efficiently determining exponential values is needed.

SUMMARY OF THE INVENTION

Thus, there is provided a method and device for processing an input value to provide an output exponential value of a desired base raised to a power of the input value. A method in accordance with the invention comprises adjusting the input value to obtain a first scaled value represented by at least one electrical signal, modifying the first scaled value to obtain an approximation value represented by at least one electrical signal, utilizing the approximation value and a memory device to determine a first exponential value of the approximation value that has a predetermined base and is represented by at least one electrical signal, and utilizing the first scaled value and the approximation value to generate an error value represented by at least one electrical signal. It is further characterized by a second scaling, the error value being scaled relative to a predetermined setting of the memory device, to obtain an adjusted error value represented by at least one electrical signal, utilizing the adjusted error value and a predetermined number of terms of a predetermined mathematical series to determine a correction value represented by at least one electrical signal, and combining the first exponential value of the approximation value with the correction value to obtain the output exponential value having the desired base raised to the power of the input and represented by at least one electrical signal.

A device in accordance with the invention utilizes a first adjusting unit to adjust the input value to obtain a first scaled value, a modifier to modify the first scaled value to obtain an approximation value and a read-only memory to utilize the approximation value. The read-only memory determines a first exponential value of the approximation value that has a predetermined base. The device further includes an error adjusting unit to utilize the first scaled value and the approximation value to generate an error value, and to scale the error value relative to a predetermined setting of the memory device, thereby obtaining an adjusted error value. Additionally, the device includes a correction generating unit to utilize the adjusted error value and a predetermined number of terms of a predetermined mathematical series to determine a correction value, and a combiner to combine the first exponential value of the approximation value with the correction value to obtain the output exponential value having the desired base raised to the power of the input.

BEST MODE FOR CARRYING OUT THE INVENTION

Figure 1A:
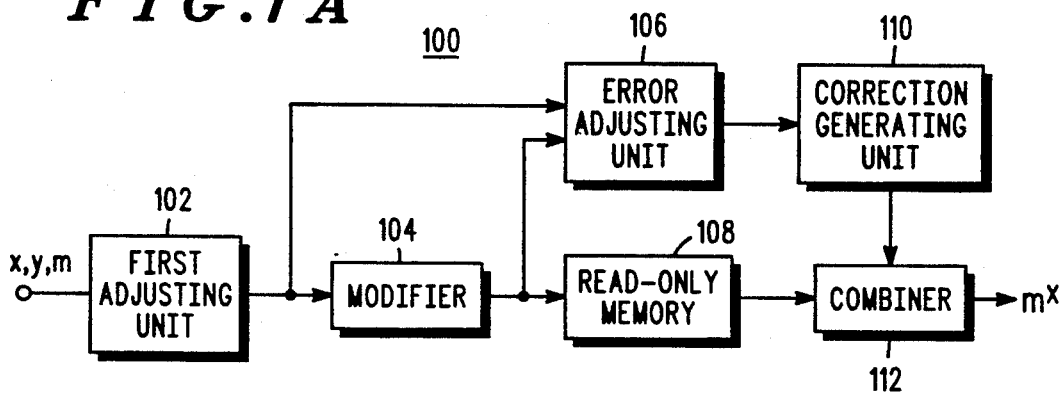
FIG. 1A is a block diagram of a computer hardware implementation of the invention.
Figure 1B:
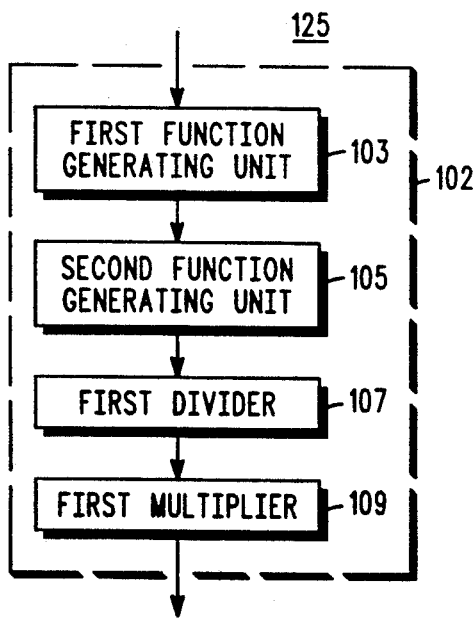
FIGS. 1B and 1C are further detailed block diagrams of certain block diagram components of FIG. 1A.

FIG. 1A illustrates one embodiment (100) of a computer hardware implementation of the invention utilizing a power series correction factor to provide an output exponential value having a desired base raised to a power of an input. An input value is provided to a first adjusting unit (102). The first adjusting unit (102), set forth in more particularity in FIG. 1B (numeral 125), utilizes a first function generating unit (103) to determine a first logarithm value of the desired base of the output exponential value. The first adjusting unit (102) further utilizes a second function generating unit (105) to determine a second logarithm value of a predetermined base of a first exponential value, the base of the second logarithm value substantially being the same as the base of the first logarithm value. Additionally, the first adjusting unit (102) utilizes a first divider (107) to determine a first quotient of the first logarithm value and the second logarithm value, and utilizes a first multiplier (109) to determine a first product value of the input value and the first quotient, such that the first product value is substantially a first scaled value.

A modifier (104) determines an approximation value, utilizing a predetermined set of values that include at least a group of values predetermined by selected rounding algorithms. A read-only memory (108) determines a first exponential value having a predetermined base raised to a power of the approximation value.

Typically in a software implementation the read-only memory scales the approximation value by an implementation dependent constant to obtain a first integral valued index for a memory device. The memory device utilizes the first integral valued index to determine a first exponential value having a predetermined base raised to the power of the approximation value. It will be obvious to one skilled in the art that numerous memory devices may be used to determine the first exponential value.

A typical hardware implementation may directly manipulate bit patterns of the approximation value to obtain a second integral valued index. A memory device utilizes the second integral value index to determine a first exponential value having a predetermined base raised to the power of the approximation value. It will be obvious to one skilled in the art that the first integral valued index obtained from a software implementation may differ from the second integral valued index created in a hardware implementation.

Figure 1C:
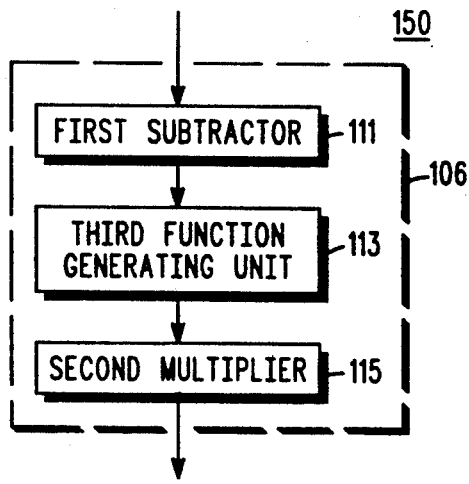

An error adjusting unit (106), set forth in more particularly in FIG. 1C (numeral 150), utilizes a first subtracter (111) to obtain a first difference value of the first scaled value and the approximation value. The error adjusting unit (106) further utilizes a third function generating unit (113) to determine a third logarithm value, base e, of the predetermined base of the first exponential value. The error adjusting unit (106) further utilizes a second multiplier (115) to determine a second product value of the first difference value and the third logarithm value, the second product value substantially being the adjusted error value.

In one embodiment of the present invention, the predetermined base of the first exponential value is a natural base e, thereby simplifying the determination of the error adjusting unit (106) by eliminating scaling the error value since the scaling factor of the error adjuster becomes one, and also by simplifying determination of the first scaled value by eliminating determination of a quotient scaling value and simply scaling the input value by multiplication of the input value by the natural base logarithm of the desired output exponential value.

In another embodiment, where a base e is selected as the desired base of the output exponential value and as the predetermined base of the first exponential value, the invention is further simplified by the elimination of the determination of the first scaled value since the first quotient becomes one, and by elimination of multiplication by the third logarithm value since the natural base logarithm of the predetermined base of the first exponential value is one.

The correction generating unit (110) substantially obtains a correction value by implementing a determiner to utilize the error value together with a predetermined number of terms of a predetermined mathematical series for substantially evaluating a predetermined number of terms, and for substantially summing the evaluated predetermined number of terms obtained thereby, obtaining an intermediate sum, the intermediate sum being substantially the correction value. The number of the predetermined number of terms, SV, of the predetermined mathematical series is a subset of terms from the predetermined mathematical series wherein the number of terms in the subset is greater than or equal to a second quotient of a desired number of bits of accuracy of the output exponential value divided by a number of bits of accuracy of the read-only memory and is represented by at least one electrical signal. For example, where 24 bits of accuracy are desired and the read-only memory (108) determines a first exponential value of the input value x to eight bits of accuracy, 24/8=3, and SV is typically selected as 3. The predetermined mathematical series is substantially a power series of the form, $$\sum_{n=0}^{\infty} \frac{c^n}{n!}$$

where c = the adjusted error value.

The determiner substantially sums the evaluated predetermined number of terms of the predetermined mathematical series to yield a first sum, substantially being the correction value:

$$\sum_{n=0}^{SV-1} \frac{c^n}{n!},$$

where c = the adjusted error value and SV = the number of the predetermined number of terms.

A combiner (112) utilizes at leat a third multiplier to determine a third product of the first exponential value and the correction value, the third product substantially being the output exponential value of the desired base raised to a power of the input value.

In the best mode of implementing the present invention, it is desirable to select a natual base first logarithm, being the first logarithm value, and being the logarithm of the desired base of the output exponential value, such that the second logarithm value is also determined having a natural base. This procedure provides the natural base logarithm of the predetermined base of the first exponential value such that said value may be utilized in determining the adjusted error value. It will be obvious to one skilled in the art that any base may be selected for the initial determination of logarithms of the desired base and of the predetermined base of the first exponential value for use in the first adjusting unit (102). However, it is more efficient to determine a natural base logarithm of both of the above cited logarithms, such that the natural base logarithm of the predetermined base of the first exponential value determined thereby may be further utilized in determining the adjusted error value.

In one embodiment, the invention may be a software program utilzing a memory device, typically a ROM.

A high performance digital processing unit (DPU) for determining an output exponential value of a desired base raised to a power of an input value is described, in the manner of the above-described device, utilizing the computer hardware described above, wherein the combiner is substantially a multiplier the for multiplying the first exponential value and the correction value, thereby substantially obtaining the output exponential value having the desired base raised to the power of the input value.

Figure 2A:
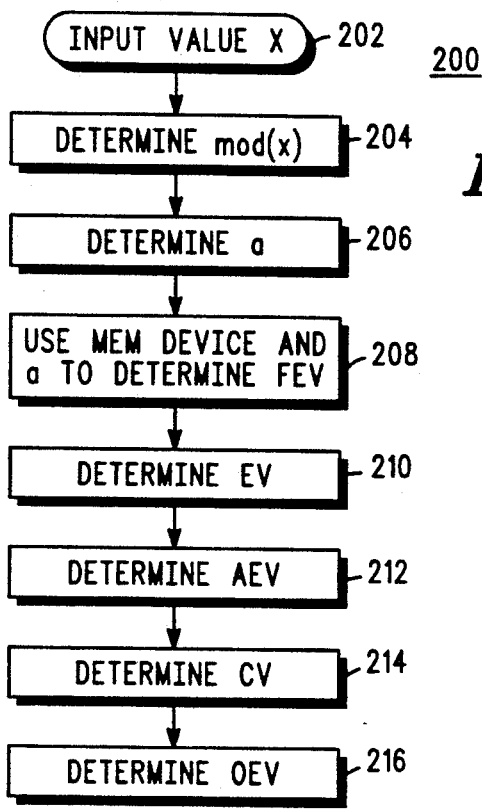
FIG. 2A is a general flow chart of an implementation of a method of the invention.

FIG. 2A, generally depicted by the numeral 200, illustrates one embodiment of a method utilizing the present invention. An input value is provided, being represented by at least one electrical signal (202). A predetermined base (PB) of a first exponential value (FEV) and a predetermined desired base (DB) of an output exponential value (OEV) are preselected as desired. The predetermined base of the first exponential value is that value selected for a ROM, look-up table, or other memory device utilized for a particular system of implementation of this invention.

Figure 2B:
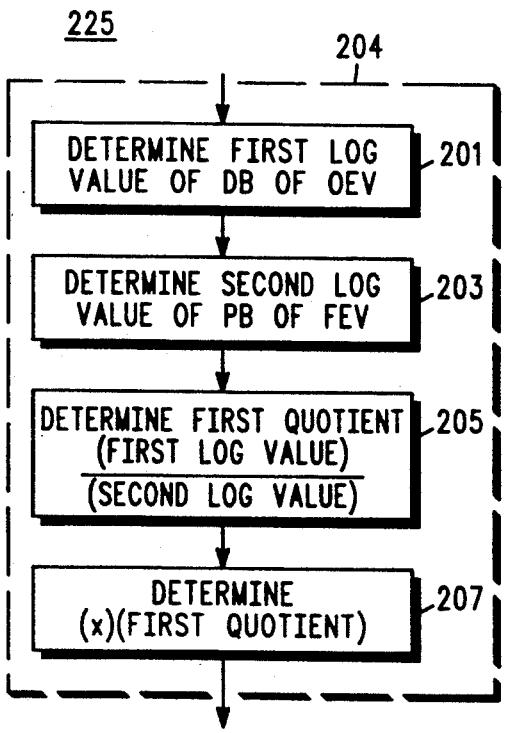
FIG. 2B is a further detailed block diagram of one step of FIG. 2A.

As set forth more particularly in FIG. 2B (numeral 225) and shown generally in FIG. 2A, a logarithm value of the predetermined base (PB) of the first exponential value (FEV) (203) and a logarithm value of the desired base (DB) of the output exponential value (OEV) (201) are determined (204), both logarithms being selected to have a same base. Selection of the natural base for both logarithms is a best mode, thereby providing a natural base logarithm of the predetermined base of the first exponential value for utilization in scaling the error value (212). The input value is scaled by multiplying (207) the input value times the quotient (205) of the logarithm of the desired base of the output exponential value divided by the logarithm of the predetermined base of the first exponential value to substantially provide a first scaled value {mod(x)} (204) that is represented by at least one electrical signal.

An approximation of the first scaled value, a, being represented by at least one electrical signal, is determined (206) by utilizing a selection from a predetermined set of values, wherein the predetermined set of values is at least a group of values predetermined by selected rounding algorithms.

A memory device is utilized to obtain the exponential value of the predetermined base raised to the power of the approximation value (FEV), thereby determining the first exponential value, that value being represented by at least one electrical signal (208). Typically, a ROM or a similar memory device is utilized. It is clear that since the FEV is substantially the predetermined base raised to the power of the approximation value, its degree of accuracy (degree to which it represents an exponential value of a desired base raised to a power of the input value) is smaller than a degree of precision of the input valve. However, the degree of precision of the FEV (degree of refinement to which the exponential value is computed) must be at least as precise as the desired degree of accuracy of the output exponential value of the desired base.

Upon determining the first scaled value and an approximation value, an error value (EV), being a difference between the first scaled value and the approximation value, is determined (210), and the EV is scaled by the natural logarithm of the predetermined base of the first exponential value, implemented by multiplication of the difference by that natural logarithm, thereby determining an adjusted error value (AEV) (212), represented by at least one electrical signal.

A selected value (SV), being a number of a predetermined number of terms of a predetermined mathematical series (PMS) of a form:

$$\sum_{n=0}^{\infty} \frac{c^n}{n!}$$

where c=the adjusted error value, is determined by obtaining a quotient of a desired number of bits of accuracy of the output exponential value and a number of bits of accuracy of the first exponential value, and utilizing a selected value greater than or equal to that quotient. The AEV is utilized in the PMS, and the SV number of the predetermined number of terms of that PMS are summed to substantially obtain a correction value, CV, represented by at least one electrical signal (214):

$$\sum_{n=0}^{SV-1} \frac{c^n}{n!},$$

where c=the adjusted error value and SV=the predetermined number of terms.

The output exponential value (OEV) of the desired base raised to the power of the input value, being represented by at least one electrical signal, is obtained (216) by obtaining a product of FEV and CV.

Figure 3:
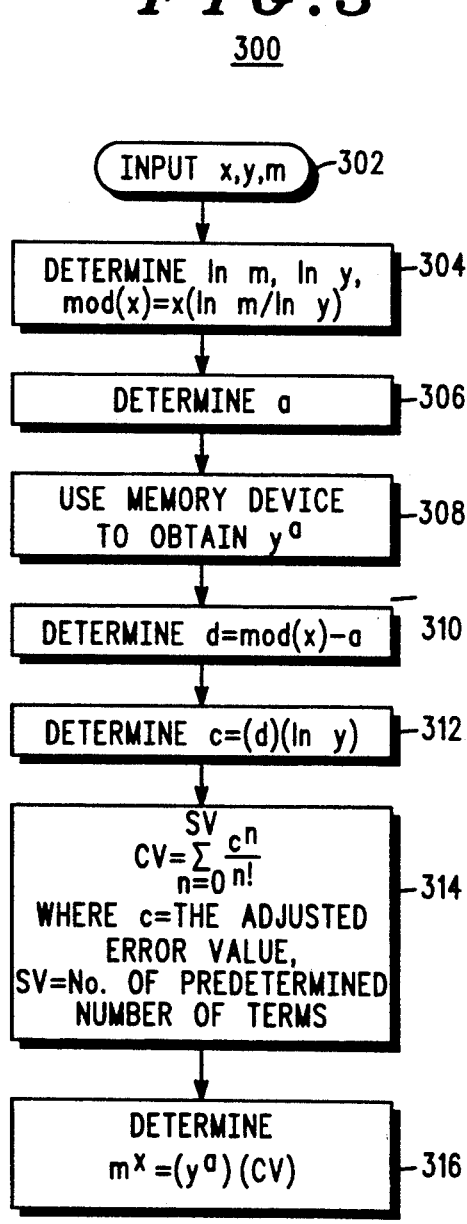
FIG. 3 is a flow chart of an implementation of the method of the invention utilizing natural base logarithms for scaling.

FIG. 3, generally depicted by the numeral 300, illustrates one implementation of the method of the invention utilizing natural base logarithms for scaling. An input value x is provided (302), being represented by at least one electrical signal. A predetermined base, y, of a first exponential value and a predetermined desired base, m, of an output exponential value are preselected as desired. A logarithm of the predetermined base of the first exponential value and a logarithm of the desired base of the output exponential value are determined (304), both logarithms being selected to have a same base. Selection of a natural base for both logarithms is a best mode, thereby also providing a natural base logarithm of the desired base of the output exponential value for utilization in scaling an error value (312). The input value is scaled by multiplying the input value times a quotient of the logarithm of the desired base of the output exponential value divided by the logarithm of the predetermined base of the first exponential value to substantially provide a first scaled value, $x(\ln m/\ln y) = \text{mod}(x)$ (304), that is represented by at least one electrical signal.

An approximation, a, of the first scaled value, mod(x), being represented by at least one electrical signal, is determined (306) by utilizing a selection from a predetermined set of values, wherein the predetermined set of values is at least a group of values predetermined by selected rounding algorithms.

A memory device is utilized to obtain the first exponential value (308) of the predetermined base raised to the power of the approximation value, $y^a$, such that $y^a$ is represented by at least one electrical signal. Typically, a ROM or a similar memory device is utilized.

Upon determining the first scaled value and an approximation value, a difference between the first scaled value and the approximation value is determined, $d = \{\text{mod}(x) - a\}$ (310), and the difference is scaled by the natural logarithm of the predetermined base of the first exponential value, implemented by multiplication of the difference by that natural logarithm, thereby determining an adjusted error value (312), c, such that $c = (d)(\ln y)$, and c is represented by at least one electrical signal.

A selected value (SV), being a number of a predetermined number of terms of a predetermined mathematical series (PMS) of a form:

$$\sum_{n=0}^{\infty} \frac{c^n}{n!}$$

where c=the adjusted error value, is determined by obtaining a quotient of a desired number of bits of accuracy of the output exponential value and a number of bits of accuracy of the first exponential value, and utilizing a selected value greater than or equal to that quotient. The adjusted error value, c, is utilized in the PMS, and the predetermined number of terms of that PMS are evaluated and summed to substantially obtain a correction value (312), $$CV = \sum_{n=0}^{SV-1} \frac{c^n}{n!}$$

where c = the adjusted error value and SV = number of predetermined number of terms, the correction value being represented by at least one electrical signal.

The output exponential value, being substantially $m^x$, of the desired base raised to the power of the input value, being represented by at least one electrical signal, is obtained (316) by determining a product of $y^a$ and CV. It is clear that for the special case of $m=y=e$, $mod(x)=x$, $c=x-a$, and $m^x=e^x$, allowing elimination of the steps of adjusting the input value to obtain a first scaled value and of scaling the error value to obtain an adjusted error value.

It is clear that, in a selected embodiment, the present invention may be implemented entirely in software. It is further clear to one skilled in the art that the order of the steps may be modified. For example, the EV may be determined prior to obtaining the FEV.

I claim:

1. A device for processing an input value to provide an output exponential value of a desired base raised to a power of the input value, comprising:
    A) first adjusting means coupled to receive the input value, a predetermined base of a first exponential value, and the desired base for obtaining a first scaled value;
    B) modification means coupled to receive the first scaled value for generating an approximation value;
    C) read-only memory (ROM) coupled to the modification means for determining the first exponential value having the predetermined base;
    D) error adjusting means coupled to the first adjusting means and the modification means for generating an adjusted error value;
    E) correction generating means coupled to the error adjusting means for determining a correction value; and
    F) combining means coupled to the read-only memory and the correction generating means for substantially obtaining the output exponential value such that the desired base is raised to the power of the input value.

2. The device of claim 1, wherein the first adjusting means includes at least:
    A) first function generating means coupled to receive the desired base of the output exponential value for determining a first logarithm value, substantially being a logarithm of the desired base of the output exponential value;
    B) second function generating means coupled to the read-only memory for determining a second logarithm value, being substantially a logarithm of the predetermined base of the first exponential value wherein the base of the second logarithm value is substantially the same as the base of the first logarithm value;
    C) first division means coupled to the first function generating means and the second function generating means for determining a first quotient of the first logarithm value and the second logarithm value; and
    D) first multiplication means coupled to receive the input value and to the first division means for determining a first product value of the input value and the first quotient, such that the first product value is substantially the first scaled value.

3. The device of claim 1, wherein the approximation value is selected from a predetermined set of values.

4. The device of claim 3, wherein the predetermined set of values is at least a group of values predetermined by selected rounding algorithms.

5. The device of claim 1, wherein the read-only memory determines a first exponential value having a predetermined base raised to a power of the approximation value.

6. The device of claim 1, wherein the error adjusting means further includes at least:
    A) first subtraction means coupled to the first adjusting means and the modification means for obtaining a first difference value of the first scaled value and the approximation value;
    B) third function generating means coupled to the predetermined base of the first exponential value for determining a third logarithm value, the logarithm value being substantially a natural base logarithm of the predetermined base of the first exponential value; and
    C) second multiplication means coupled to the first subtraction means and the third function generating means for determining a second product value of the first difference value and the third logarithm value, the second product value subtantially being the adjusted error value.

7. The device of claim 1, wherein the correction generating means further includes:
    determining means, coupled to the error adjusting means for utilizing the error value together with a predetermined number of terms of a predetermined mathematical series to substantially evaluate a predetermined number of terms, and for substantially summing the evaluated predetermined number of terms obtained thereby, obtaining an intermediate sum, the intermediate sum being substantially the correction value
    wherein the predetermined number of terms is a subset of terms from the predetermined mathematical series and wherein the number of terms in the subset is greater than or equal to a second quotient of a desired number of bits of accuracy of the output exponential value divided by a number of bits of accuracy of the read-only memory and is represented by at least one electrical signal and
    wherein the predetermined mathematical series is substantially a power series such that the power series is substantially the following series of a form:

$$\sum_{n=0}^{\infty} \frac{c^n}{n!}$$

where c = the adjusted error value.

8. The device of claim 1, wherein the combining means coupled to the read-only memory and the correction generating means determines a third product, the third product being substantially the output exponential value of the desired base raised to a power of the input value.

9. A high performance digital processing unit (DPU) for determining an output exponential value of a desired base raised to a power of an input value, comprising:
   A) first adjusting means coupled to receive the input value, a predetermined base of a first exponential value, and the desired base for obtaining a first scaled value;
   B) modification means coupled to receive the first scaled value for generating an approximation value;
   C) read-only memory (ROM) coupled to the modification means for determining a first exponential value having a predetermined base;
   D) error adjuster coupled to the first adjusting means and the modification means for generating an adjusted error value;
   E) correction generating means coupled to the error adjuster for determining a correction value;
   F) multiplication means coupled to the read-only memory and the correction generating means for obtaining a first product of the first exponential value and the correction value, thereby substantially obtaining the output exponential value such that the desired base is raised to the power of the input value.

10. The DPU of claim 9, wherein the first adjusting means includes at least:
   A) first function generating means coupled to receive the desired base of the output exponential value for determining a first logarithm value, substantially being a logarithm of the desired base of the output exponential value;
   B) second function generating means coupled to the read-only memory for determining a second logarithm value, being substantially a logarithm of the predetermined base of the first exponential value, wherein the base of the second logarithm value is substantially the same as the base of the first logarithm value;
   C) first division means coupled to the first function generating means and the second function, generating means for determining a first quotient of the first logarithm value and the second logarithm value; and
   D) first multiplication means coupled to receive the input value and the first division means for determining a first product value of the input value and the first quotient, such that the first product value is substantially the first scaled value.

11. The DPU of claim 9, wherein the approximation value is selected from a predetermined set of values.

12. The DPU of claim 11, wherein the predetermined set of values is at least a group of values predetermined by selected rounding algorithms.

13. The DPU of claim 9, wherein the read-only memory determines a first exponential value having a predetermined base raised to a power of the approximation value.

14. The DPU of claim 9, wherein the error adjuster further includes at least:
   A) first subtraction means coupled to the first adjusting means and the modification means for obtaining a first difference value of the first scaled value and the approximation value;
   B) third function generating means coupled to the predetermined base of the first exponential value for determining a third logarithm value, the logarithm value being substantially a natural base logarithm, of the predetermined base of the first exponential value; and
   C) second multiplication means coupled to the first substraction means and the third function generating means for determining a second product value of the first difference value and the third logarithm value, the second product value substantially being the adjusted error value.

15. The DPU of claim 9, wherein the correction generating means further includes:
   determining means, coupled to the error adjuster for utilizing the error value together with a predetermined number of terms of a predetermined mathematical series to substantially evaluate a predetermined number of terms, and for substantially summing the evaluated predetermined number of terms obtained thereby, obtaining an intermediate sum, the intermediate sum being substantially the correction value
   wherein the predetermined number of terms of the predetermined mathematical series is a subset of terms from the predetermined mathematical series and wherein the number of terms in the subset is equal to a second quotient of a desired number of bits of accuracy of the output exponential value divided by a number of bits of accuracy of the read-only memory and is represented by at least one electrical signal and
   wherein the predetermined mathematical series is substantially a power series such that the power series is substantially the following series of a form:

$$\sum_{n=0}^{\infty} \frac{c^n}{n!}$$

where C=the adjusted error value.

16. A device for processing an input value, x, to provide an output exponential value, $m^x$, of a desired base, m, raised to a power of the input value and having the desired degree of accuracy, comprising:
   A) first adjusting means coupled to receive the input value, a predetermined base of a first exponential value, and the desired base for obtaining a first scaled value;
   B) modification means coupled to the first scaled value, x', for generating an approximation value, a;
   C) read-only memory (ROM) coupled to the modification means to determine a first exponential value, $y^a$, having a predetermined base, y;
   D) error adjusting means coupled to the first adjusting means and the modification means for generating an adjusted error value, c;
   E) correction generating means coupled to the error adjusting means for determining a correction value; and
   F) combining means coupled to the read-only memory and the correction generating means for obtaining the output exponential value, substantially $m^x$, such that the desired base, m, is raised to the power of the input value, x, and has the desired degree of accuracy.

17. The device of claim 16, wherein the first adjusting means includes at least:
   A) first function generating means coupled to receive the desired base of the output exponential value for determining a first natural logarithm value of the desired base of the output exponential value, substantially ln m;
   B) second function generating means coupled to the read-only memory for determining a second natural logarithm value of the predetermined base, of the first exponential value, substantially ln y;
   C) first division means coupled to the first function generating means and the second function generating means for determining a first quotient of the first natural logarithm value and the second natural logarithm value, substantially (ln m)/(ln y); and
   D) first multiplication means coupled to the input value and the first division means for determining a first product value of the input value and the first quotient, such that the first product value is substantially the first scaled value, substantially $$mod(x) = \{(x)(\ln m)/(\ln y)\}.$$

18. The device of claim 16, wherein the approximation value is selected from a predetermined set of values.

19. The device of claim 18, wherein the predetermined set of values is at least group of values predetermined by selected rounding algorithm values.

20. The device of claim 16, wherein the first exponential value, $y^a$, substantially has a predetermined base, y, raised to a power of the approximation value, a, and substantially has a predetermined degree of accuracy and a predetermined degree of precision.

21. The device of claim 20, wherein the predetermined degree of precision is greater than or equal to the desired degree of accuracy of the output exponential value and the predetermined degree of accuracy is less than the desired degree of accuracy of the output exponential.

22. The device of claim 16, wherein the error adjusting means further includes at least:
   A) first substraction means coupled to the first adjusting means and the modification means for obtaining a first difference value of the first scaled value and the approximation value, substantially $\{mod(x)-a\}$;
   B) second multiplication means coupled to the first subtraction means and the read-only memory for determining a second product value, the second value substantially being the adjusted error value, substantially $$c = \{mod(x) - a\}\{\ln y\}.$$

23. The device of claim 16, wherein the correction generating means further includes:
   determining means, coupled to the error adjusting means for utilizing the error value together with a predetermined number of terms of a predetermined mathematical series to substantially evaluate a predetermined number of terms, and for substantially summing the evaluated predetermined number of terms obtained thereby, obtaining an intermediate sum, the intermediate sum being substantially the correction value
   wherein the predetermined number of terms of the predetermined mathematical series is a subset of terms from the predetermined mathematical series and wherein the number of terms in the subset is greater than or equal to a second quotient of a desired number of bits of accuracy of the output exponential value divided by a number of bits of accuracy of the read-only memory and is represented by at least one electrical signal,
   wherein the predetermined mathematical series is substantially of a form:

$$\sum_{n=0}^{\infty} \frac{c^n}{n!}$$

where c = the adjusted error value, and
   wherein the determining means includes at least evaluation means for evaluating the predetermined number of terms of the predetermined mathematical series such that the number of the predetermined number of terms is SV, and first addition means for substantially summing the evaluated predetermined number of terms of the predetermined mathematical series to obtain a first sum, the first sum substantially being the correction value:

$$CV = \sum_{n=0}^{SV-1} \frac{c^n}{n!}$$

where c = the adjusted error value and SV = number of the predetermined number of terms.

24. The device of claim 16, wherein the combining means further includes at least:
   multiplication means coupled to the read-only memory and the correction generating means for substantially obtaining a first product of the first exponential value and the correction value, thereby substantially obtaining the output exponential value, $m^x$, such that the desired base is raised to the power of the input value.

* * * * *

UNITED STATES PATENT AND TRADEMARK OFFICE
CERTIFICATE OF CORRECTION

PATENT NO. : 5,177,702
DATED : January 5, 1993
INVENTOR(S) : Brett L. Lindsley

It is certified that error appears in the above-identified patent and that said Letters Patent is hereby corrected as shown below:

In the claims:

At column 9, line 45, "function, generating" should be --function generating--.

At column 11, lines 47-48, "(x-)" should be --(x)--.

Signed and Sealed this

Sixteenth Day of November, 1993

BRUCE LEHMAN

*Attest:*

*Attesting Officer*  *Commissioner of Patents and Trademarks*